US011756443B2

(12) United States Patent
Numata et al.

(10) Patent No.: US 11,756,443 B2
(45) Date of Patent: Sep. 12, 2023

(54) LEARNING SUPPORT SYSTEM

(71) Applicants: Hitachi, Ltd., Tokyo (JP); Kyoto University, Kyoto (JP)

(72) Inventors: Takashi Numata, Tokyo (JP); Ryuji Mine, Kyoto (JP)

(73) Assignees: HITACHI, LTD., Tokyo (JP); KYOTO UNIVERSITY, Kyoto (JP)

( * ) Notice: Subject to any disclaimer, the term of this patent is extended or adjusted under 35 U.S.C. 154(b) by 36 days.

(21) Appl. No.: 17/762,860

(22) PCT Filed: Apr. 28, 2020

(86) PCT No.: PCT/JP2020/018176
§ 371 (c)(1),
(2) Date: Mar. 23, 2022

(87) PCT Pub. No.: WO2021/220429
PCT Pub. Date: Nov. 4, 2021

(65) Prior Publication Data
US 2022/0343785 A1    Oct. 27, 2022

(51) Int. Cl.
*G09B 5/06* (2006.01)
*G06V 40/16* (2022.01)
*G09B 5/08* (2006.01)

(52) U.S. Cl.
CPC .......... *G09B 5/065* (2013.01); *G06V 40/174* (2022.01); *G09B 5/08* (2013.01)

(58) Field of Classification Search
CPC ............. G09B 5/06; G09B 5/08; G06V 40/16
See application file for complete search history.

(56) References Cited

U.S. PATENT DOCUMENTS

2012/0156659 A1* 6/2012 Yun .......................... G09B 5/06
434/157
2013/0309646 A1* 11/2013 Asano .................... G09B 19/00
434/350
(Continued)

FOREIGN PATENT DOCUMENTS

JP          2010-094493 A       4/2010

OTHER PUBLICATIONS

International Search Report of PCT/JP2020/018176 dated Jul. 14, 2020.

*Primary Examiner* — Nathan Hillery
(74) *Attorney, Agent, or Firm* — MATTINGLY & MALUR, PC (57) ABSTRACT

Provided is a learning support system which can enhance a learning effect by sharing a matter of interest among learners viewing a learning content. The learning support system includes: a learning content display unit configured to play and display a teaching material video; a learner information reporting unit configured to acquire biological information of a learner during play of the teaching material video and report the biological information as learner information; a region-of-attention identification unit configured to identify a region-of-attention of the learner based on the biological information; a learner information display creation unit configured to generate a screen in which the region-of-attention is superimposed on the teaching material video of another learner belonging to the same cluster as the learner; and a learner information transmission unit configured to transmit the screen to the another learner.

11 Claims, 7 Drawing Sheets

(56) References Cited

U.S. PATENT DOCUMENTS

| | | | |
|---|---|---|---|
| 2015/0099255 A1* | 4/2015 | Aslan | G09B 19/00 |
| | | | 434/350 |
| 2015/0206443 A1* | 7/2015 | Aylesworth | G09B 5/02 |
| | | | 434/322 |
| 2018/0075772 A1* | 3/2018 | Carr | G09B 19/00 |
| 2020/0143704 A1* | 5/2020 | Liao | G06F 16/71 |
| 2021/0043101 A1* | 2/2021 | Kim | G06F 3/0488 |
| 2022/0139256 A1* | 5/2022 | Lee | G10L 15/22 |

* cited by examiner

REGION-OF-ATTENTION STORAGE UNIT 113

| LEARNER ID | TEACHING MATERIAL ID | ELAPSED TIME IN TEACHING MATERIAL | REGION-OF-ATTENTION | PSYCHOLOGICAL STATE | SPEECH |
|---|---|---|---|---|---|
| 113a | 113b | 113c | 113d | 113e | 113f |
|  |  |  |  |  |  |

LEARNING SUPPORT SYSTEM

TECHNICAL FIELD

The present invention relates to a learning support system.

BACKGROUND ART

PTL 1 discloses an emotion determination device that receives a face video and an eye movement video of a viewer to determine an emotion of the viewer. This device calculates a position of a viewpoint, calculates a change in physiological reaction data due to a change in a pupil diameter, and an acceleration associated with the change, and diagnoses emotions and feelings of interest and attention at the same time by comparing the calculated values with accumulated values.

CITATION LIST

Patent Literature

PTL 1: JP-A-2010-94493

SUMMARY OF INVENTION

Technical Problem

PTL 1 described above can determine the emotion of the viewer, but cannot share a change in emotion caused by viewing a common object among multiple people.

An object of the invention is to provide a technique for enhancing a learning effect by sharing a matter of interest among learners viewing a learning content.

Solution to Problem

The present application includes plural units that solve at least a part of the above problems, and is exemplified as follows.

According to one aspect of the invention, a learning support system includes: a learning content display unit configured to play and display a teaching material video; a learner information reporting unit configured to acquire biological information of a learner during play of the teaching material video and report the biological information as learner information; a region-of-attention identification unit configured to identify a region-of-attention of the learner based on the biological information; a learner information display creation unit configured to generate a screen in which the region-of-attention is superimposed on the teaching material video of another learner belonging to the same cluster as the learner; and a learner information transmission unit configured to transmit the screen to the another learner.

Advantageous Effect

According to the invention, a learning effect can be enhanced by sharing a matter of interest among learners viewing a learning content.

Technical problems, configurations and effects other than those described above will be clarified by the description of the following embodiments.

DESCRIPTION OF EMBODIMENTS

In the following embodiments, description may be divided into plural sections or embodiments when necessary for convenience. Unless particularly specified, the sections or embodiments are not independent of each other, but have a relation such that one is a modification, detailed description, supplementary description, or the like of a part or all of the others.

In the following embodiments, when a number or the like (including a number, a numeric value, an amount, a range, and the like) of an element is referred to, the number or the like is not limited to a specific number, and may be equal to, greater than or less than the specific number, unless otherwise specified or clearly limited to the specific number in principle.

Further, in the embodiments described below, it is needless to say that the constituent elements (including element steps) are not always essential unless otherwise stated or considered as apparently essential in principle.

Similarly, in the following embodiments, when reference is made to shapes, positional relations, and the like of the elements or the like, those having substantially approximate or similar shapes or the like are inclusive unless otherwise particularly specified or considered to be clearly not inclusive in principle. The same applies to numerical values and ranges.

In all drawings for describing the embodiments, the same members are denoted by the same reference numerals in principle, and repetitive descriptions thereof will be omitted. Hereinafter, each embodiment of the invention will be described with reference to the drawings.

In recent years, efforts have been made to promote active learning that prompts learning of knowledge and skills by initiative learning of learners. As compared with classes centered on classroom learning, in the active learning, a learner independently participates in the class, communicates, cooperates or discusses with an educator or another learner, and thus can efficiently acquire and deeply understand knowledge, skills, and ways of thinking.

On the other hand, in recent years, a method of online learning (e-learning) without going to an education site is becoming widespread. E-learning has an advantage that a learner can learn anytime and anywhere, but is difficult to achieve communication between an educator who provides learning content and a learner, or between learners. Therefore, compared to active learning in an education site, active learning utilizing e-learning is more difficult to achieve (difficult to enhance learning efficiency and learning result).

As a method for solving such a problem, a method of promoting communication with an educator and other learners by sharing a content (what kind of interest the learners have), a target (in which part the learners are interested), and a reason (why the learners are interested) of interest or concern of other learners with respect to e-learning content is useful.

On the other hand, in order to sufficiently know the content, the target, and the reason of interest of the other learners, there are specific problems such as not being capable of sufficiently understanding a content described with a short sentence, conversely taking time to understand (or being incapable of understanding) a content described with a long sentence due to low readability, and incapable of sufficiently understanding the content, the target, and the reason of interest or concern of multiple other learners even if displayed simultaneously.

Therefore, in the invention, by acquiring non-linguistic information (facial expression and sight line) of the learner in addition to the linguistic information, contents, targets, and reasons of interest or concern of the other learners are estimated, and the estimation result is displayed with non-linguistic information (color and shape). Further, by limiting the other learners to be displayed by a predetermined method, the display is limited to have higher usefulness.

Figure 1:
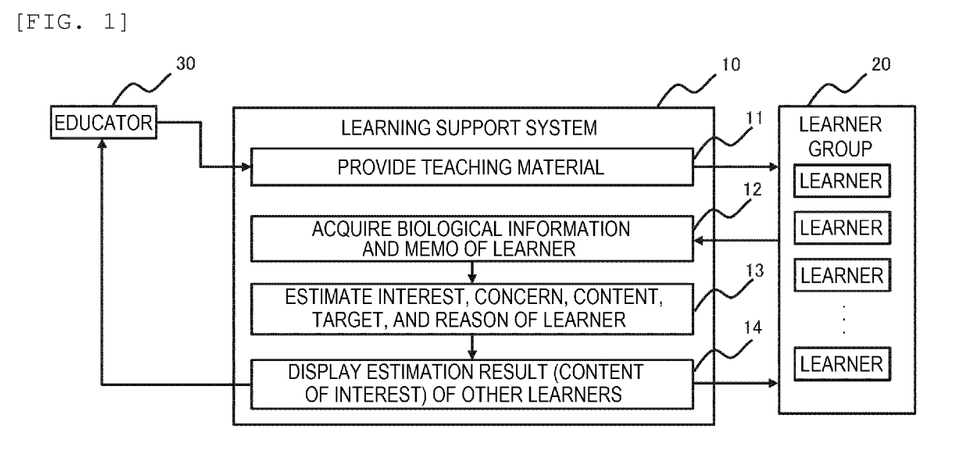
FIG. 1 is a diagram showing an outline of functions of a learning support system according to a first embodiment.

FIG. 1 is a diagram showing an outline of functions of a learning support system according to a first embodiment. A learning support system 10 according to the invention has a function of, when providing an e-learning content serving as a teaching material (11), repeatedly performing a series of steps of: acquiring, from the acquired data, a facial expression, a sight line, and a learning memo of each individual learner of a learner group 20 including a plurality of learners (12); estimating contents, targets, and reasons of interest and concern of the learners (13); and displaying estimation results of the other learners to an educator or a learner (14). Accordingly, it is possible to promote an educator 30 to provide an e-learning content having a high learning effect, and the learner can understand the content, the target, and the reason of interest or concern of the other learners, so as to deepen understanding on the learning content itself (deepen the understanding by starting to consider something never doubted before) or improve learning efficiency (to easily understand a region or a content of attention).

The learning support system 10 can display, on a teaching material, the contents, targets, and reasons of interest or concern estimated based on facial expressions and sight lines of the other learners. In order to display the content, the target, and the reason of interest or concern of each learner in an easy-to-understand manner, for example, estimation results of different learners are displayed by different figures (any geometric information such as a polygon and a circle) in accordance with coordinates of the target of interest or concern. As contents and reasons of interest or concern, for example, a result estimated based on a psychological state such as whether the learner has a positive emotion on the target (can understand without any problem) or a negative emotion (cannot understand well and feels stress or has a question) is displayed in a color (blue or green in the case of a positive feeling, red in the case of a negative or passive feeling, or the like).

The learning support system 10 can be installed with a dialogue agent that analyzes a facial expression, a sight line, and a learning memo (comment) acquired from each learner and outputs information and comments related to targets and contents of interest of many learners. The learning support system 10 can display details of contents and reasons of interest or concern of the other learners (comments of other learners).

Further, the learning support system 10 measures not only the learning content but also the facial expression and the sight line of the other learners with respect to the dialogue agent and the comment of the other learners (when the region-of-attention is a display area of the dialogue agent or a display area of the comment), and also displays the result of estimating the content, the target, and the reason of interest or concern with respect to the output information of the dialogue agent or the comment of the other learners.

The learning support system 10 displays, to the educator 30, a region-of-attention, a comment, and the like with respect to the content, the target, and the reason of particular interest or concern, and the content considered to be difficult for the learners to understand, among the data of the learners. Accordingly, the educator 30 can be recommended to modify or add the learning content itself.

Figure 2:
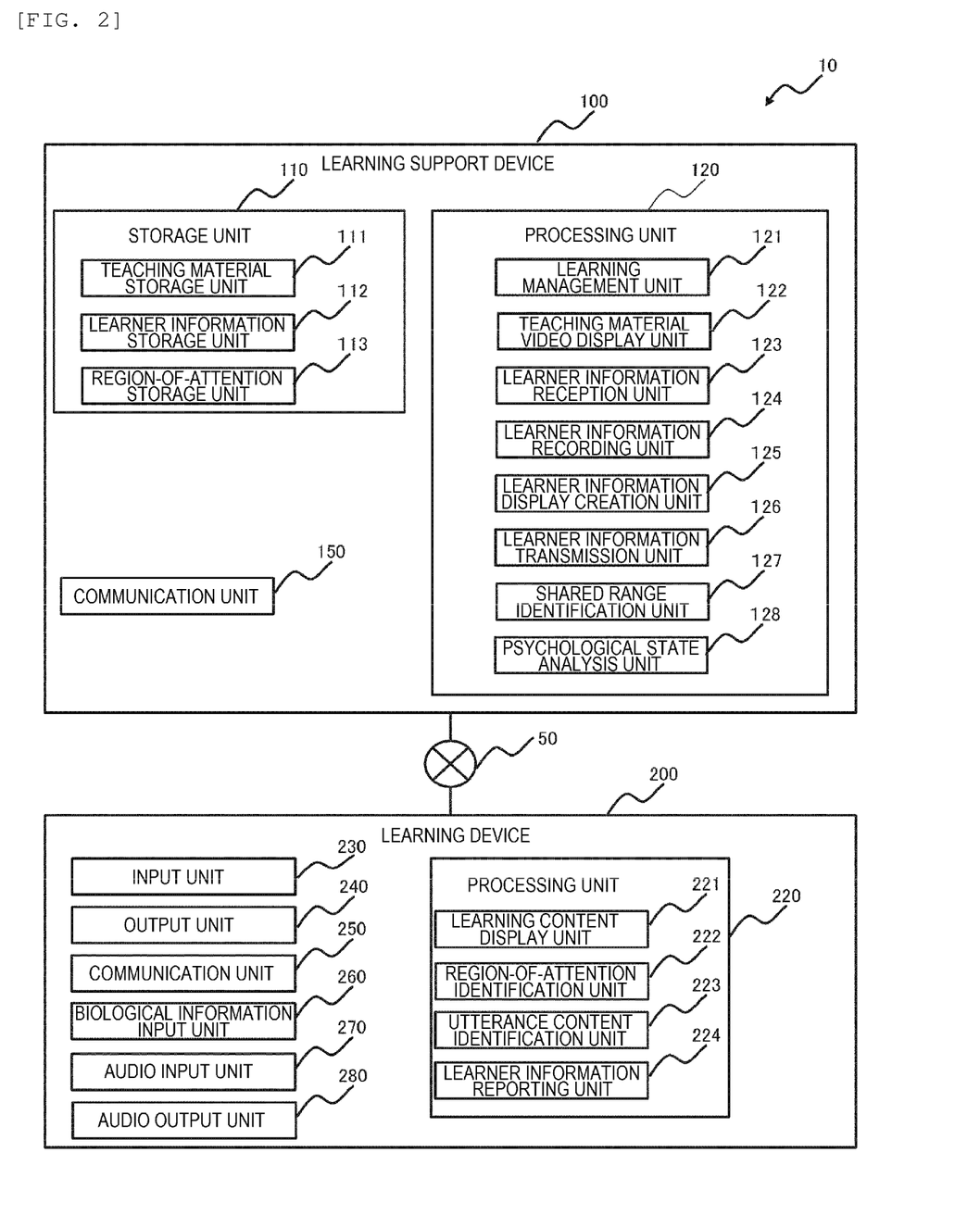
FIG. 2 is a diagram showing a configuration example of the learning support system.

FIG. 2 is a diagram showing a configuration example of the learning support system. The learning support system 10 includes a learning support device 100 and a learning device 200 communicably connected to the learning support device 100 via a network 50.

The learning support device 100 includes a storage unit 110, a processing unit 120, and a communication unit 150. The storage unit 110 includes a teaching material storage unit 111, a learner information storage unit 112, and a region-of-attention storage unit 113.

Figure 3:
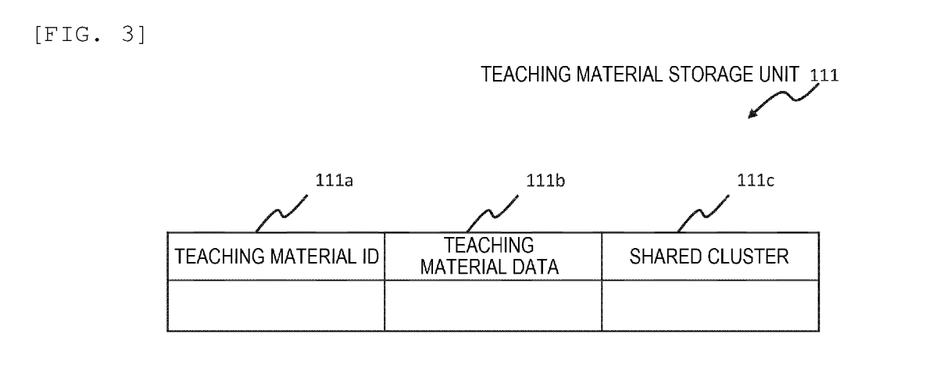
FIG. 3 is a diagram showing an example of a data structure stored in a teaching material storage unit.

FIG. 3 is a diagram showing an example of a data structure stored in the teaching material storage unit. The teaching material storage unit 111 stores a teaching material ID 111a, teaching material data 111b, and a shared cluster 111c in association with each other.

The teaching material ID 111a is information for identifying a teaching material video for explaining a learning content using a video. The teaching material data 111b is data of the teaching material video for explaining the learning content using the video. The shared cluster 111c is information for identifying a shared range of clusters that are dynamic or static groups for classifying learners viewing the teaching material according to a predetermined criterion.

Figure 4:
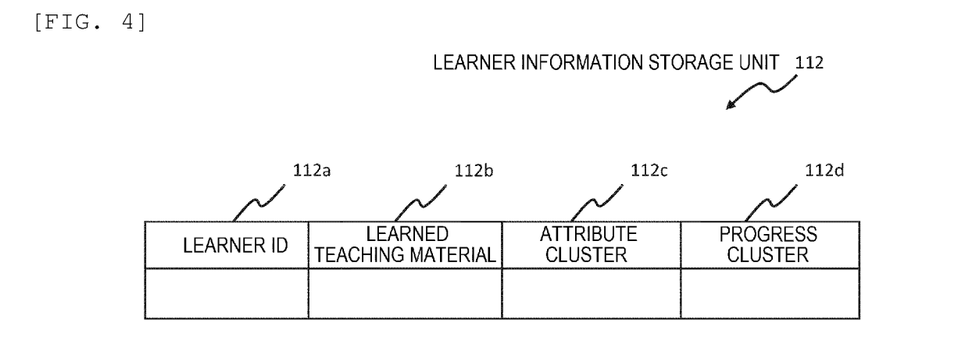
FIG. 4 is a diagram showing an example of a data structure stored in a learner information storage unit.

FIG. 4 is a diagram showing an example of a data structure stored in the learner information storage unit. The learner information storage unit 112 stores a learner ID 112a, a learned teaching material 112b, an attribute cluster 112c, and a progress cluster 112d in association with each other.

The learner ID 112a is information for identifying a learner. The learned teaching material 112b is information of a teaching material that the learner identified by the learner ID 112a has finished learning in the past. The attribute cluster 112c is information for identifying an organization to which the learner identified by the learner ID 112a belongs (mainly a static organization, for example, a department or a class to which the learner belongs). The progress cluster 112d is information for identifying a dynamic organization constituted by a plurality of learners having the same degree of learning progress as that of the learner identified by the learner ID 112a. More specifically, for example, the progress cluster is a group constituted by a plurality of learners who have similar learned teaching materials, and the progress cluster 112d is information for identifying the progress cluster. It is desirable that the progress cluster is constituted by a plurality of learners having similar understanding levels of the learned teaching materials. In particular, in a group having similar learning progresses, it is considered that differences in the understanding levels between learners are similar and are highly likely to have common feelings on awareness and questions, and the effect of active learning is likely to appear.

Figure 5:
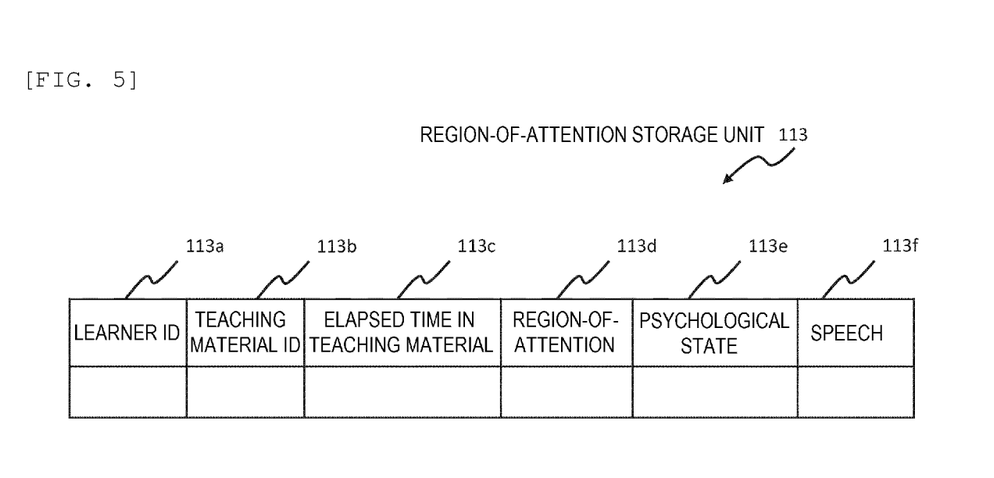
FIG. 5 is a diagram showing an example of a data structure stored in a region-of-attention storage unit.

FIG. 5 is a diagram showing an example of a data structure stored in the region-of-attention storage unit. The region-of-attention storage unit 113 stores a learner ID 113a, a teaching material ID 113b, an elapsed time in teaching material 113c, a region-of-attention 113d, a psychological state 113e, and a speech 113f in association with each other.

The learner ID 113a is information for identifying a learner. The teaching material ID 113b is information for identifying a teaching material to be learned by the learner identified by the learner ID 113a. The elapsed time in teaching material 113c is information for identifying the time elapsed from the start of the play of the video of the teaching material when the teaching material identified by the teaching material ID 113b is played in time series.

The region-of-attention 113d is information for identifying a region paid attention at the time of learning of the learner identified by the learner ID 113a. The psychological state 113e is information indicating a psychological state (including feelings and emotions) estimated when the learner identified by the learner ID 113a learns the teaching material. The speech 113f is information indicating linguistic information (including an utterance by audio, and a comment or a memo input in text) uttered by the learner identified by the learner ID 113a at the time of learning the teaching material.

Return to the description in FIG. 2. The processing unit 120 includes a learning management unit 121, a teaching material video display unit 122, a learner information reception unit 123, a learner information recording unit 124, a learner information display creation unit 125, a learner information transmission unit 126, a shared range identification unit 127, and a psychological state analysis unit 128.

The learning management unit 121 manages a learning state of the learner. The teaching material video display unit 122 creates a screen for playing the teaching material video. The learner information reception unit 123 receives learner information including a region-of-attention and an utterance of the learner. The learner information recording unit 124 stores the learner information received by the learner information reception unit 123 in the learner information storage unit 112 and the region-of-attention storage unit 113.

The learner information display creation unit 125 creates information of a screen structure (for example, a figure having color information of a display object according to an average value of emotions in units of learner cluster) in which learner information including a region-of-attention and an utterance of a learner and learner information including a region-of-attention and an utterance of each of the other learners belonging to the same cluster are displayed in a superimposed manner.

The learner information display creation unit 125 integrates information indicating a time-series change of the region-of-attention when the region-of-attention is superimposed. The learner information display creation unit 125 superimposes information indicating the psychological state (for example, predetermined color information corresponding to the information indicating the psychological state) together with the region-of-attention by predetermined geometric information (for example, a circle, or a predetermined polygon such as a triangle or a square). The learner information display creation unit 125 performs audio recognition or the like on the language output information, extracts the language output information, generates a comment sentence, and superimposes the comment sentence together with the region-of-attention. For example, the learner information display creation unit 125 generates a screen in which the region-of-attention is superimposed by a predetermined polygon.

Alternatively, the learner information display creation unit 125 may generate the screen in which the region-of-attention is superimposed while targeting a region-of-attention for which an instruction is received from a learner.

The learner information transmission unit 126 transmits the screen structure based on the learner information including the region-of-attention and the utterance of the learner to the learners belonging to the cluster of the shared range identified by the shared range identification unit 127.

The shared range identification unit 127 specifies, for each learner, a cluster to be a shared range in accordance with a teaching material to be learned. For example, when a shared range for a certain teaching material is specified as a progress cluster including other learners having similar learning progress, the shared range identification unit 127 specifically identifies the learners belonging to the shared range of the teaching material for each individual learner.

The psychological state analysis unit 128 analyzes and identifies the psychological state of the learner using an existing algorithm or the like. For example, the psychological state analysis unit 128 uses transition and staying state of the region-of-attention based on the biological information of the learner, a changing degree of the facial expression, and an utterance content to estimate a psychological state such as whether the learner has a positive emotion (can understand without any problem), or has a negative emotion (cannot understand well and feels stress or has a question) on the target teaching material, explanatory audio, or the like.

The communication unit 150 communicates with the learning device 200 via the network 50.

The network 50 is, for example, a local area network (LAN), an optical fiber network, a gigabit network, a wireless communication network, or a combination thereof, and communicably connects the learning support device 100 and the learning device 200.

The learning device 200 includes a processing unit 220, an input unit 230, an output unit 240, a communication unit 250, a biological information input unit 260, an audio input unit 270, and an audio output unit 280.

The processing unit 220 includes a learning content display unit 221, a region-of-attention identification unit 222, an utterance content identification unit 223, and a learner information reporting unit 224.

The learning content display unit 221 plays and displays the teaching material video. The learning content display unit 221 can also output a geometric information corresponding to the information indicating the psychological state of the learner and the comment sentence received from the learning support device 100 by display or audio via a predetermined dialogue agent.

The region-of-attention identification unit 222 identifies a region-of-attention of the learner based on the biological information. Specifically, the region-of-attention is identified based on the facial expression or the sight line in accordance with a position of the sight line in which the learner gazes at the screen or a gazing time.

The utterance content identification unit 223 acquires the language output information of the learner and identifies the utterance content. The utterance content identification unit 223 may identify the utterance content by interpreting the meaning of the utterance using the language output information and facial expression information of the learner.

The learner information reporting unit 224 acquires the biological information of the learner during the play of the teaching material video as learner information. The learner information is reported to the learning support device 100. The learner information reporting unit 224 acquires the language output information of the learner together with the biological information of the learner during the play of the teaching material video, and integrates the language output information of the learner in the learner information.

The input unit 230 receives input of text information from the learner via a keyboard or the like.

The output unit 240 displays a display screen to the learner.

The communication unit 250 communicates with the learning support device 100 via the network 50.

The biological information input unit 260 receives an input of an image including the facial expression and the position of the sight line of the learner as the biological information.

The audio input unit 270 receives audio information uttered by the learner.

The audio output unit 280 outputs audio information to the learner.

Each learner of the learner group 20 connects to the learning support device 100 via the network 50 using the learning device 200, and views and learns the video of the teaching material created by the educator 30.

Figure 6:
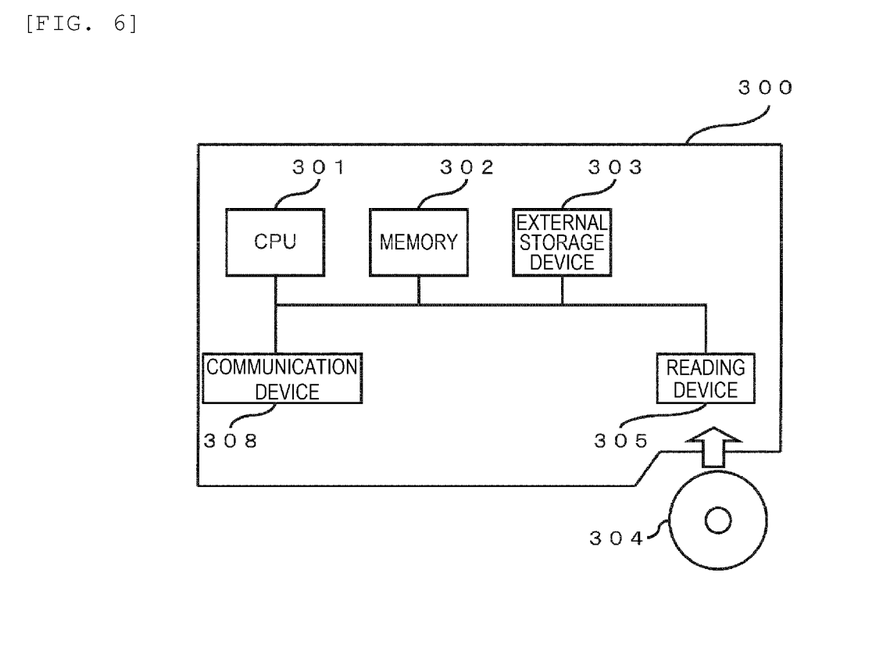
FIG. 6 is a diagram showing an example of a hardware configuration of a learning support device.

FIG. 6 is a diagram showing an example of a hardware configuration of the learning support device. The learning support device 100 is implemented by a computer device 300. The computer device 300 includes an arithmetic device such as a central processing unit (CPU) 301, a memory 302 as a main storage device, an external storage device 303 such as a hard disk or a solid state drive (SSD), a storage medium 304 such as a CD-ROM or a digital versatile disk (DVD), a reading device 305 that reads at least the storage medium 304, a communication device 308 such as a network interface card (NIC), and a bus that connects these components.

The memory 302 is, for example, a memory such as a random access memory (RAM).

The external storage device 303 is a non-volatile storage device that can store digital information, such as a so-called hard disk, an SSD, or a flash memory.

The communication device 308 is a wired communication device that performs a wired communication via a network cable, or a wireless communication device that performs a wireless communication via an antenna. The communication device 308 communicates with other devices connected to the network 50. For the communication, packet communication based on the TCP/IP protocol is employed, but is not limited thereto.

The learning management unit 121, the teaching material video display unit 122, the learner information reception unit 123, the learner information recording unit 124, the learner information display creation unit 125, the learner information transmission unit 126, the shared range identification unit 127, and the psychological state analysis unit 128 described above are implemented by a program that causes the CPU 301 to perform processing. The program is stored in the memory 302 or the external storage device 303, loaded onto the memory 302 in execution, and executed by the CPU 301.

The teaching material storage unit 111, the learner information storage unit 112, and the region-of-attention storage unit 113 stored in the storage unit 110 are implemented by the memory 302 and the external storage device 303.

The communication unit 150 communicably connected to the LAN or the like is implemented by the communication device 308.

The above is an example of the hardware configuration of the learning support device 100 according to the present embodiment. However, the invention is not limited thereto, and other hardware may be used. For example, the information processing device may be any of various types of information processing devices such as a tablet device, a smartphone, and a television device.

Although not illustrated, the learning support device 100 includes known elements such as an OS, middleware, and an application.

Figure 7:
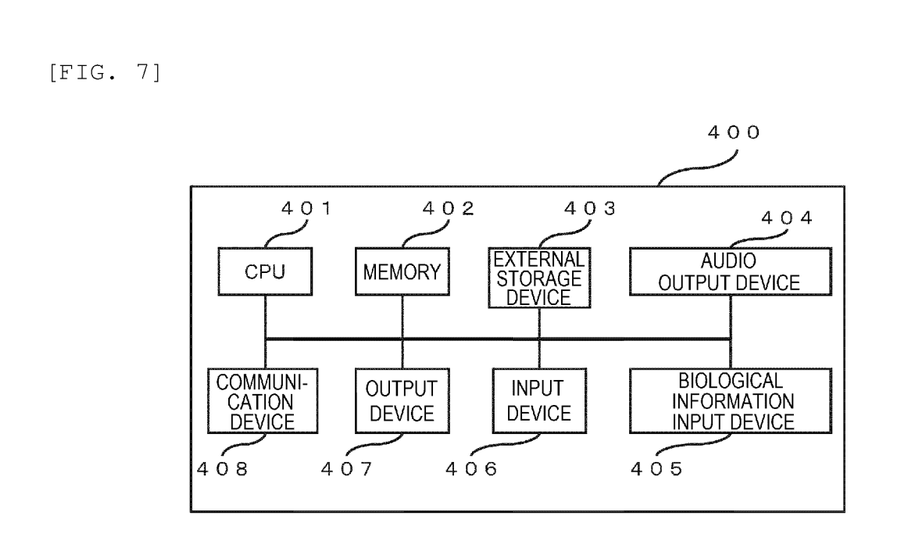
FIG. 7 is a diagram showing an example of a hardware configuration of a learning device.

FIG. 7 is a diagram showing an example of the hardware configuration of the learning device. The learning device 200 is implemented by the computer device 400. The computer device 400 includes: an arithmetic device such as a CPU 401; a memory 402 which is a main storage device; an external storage device 403 such as a hard disk or an SSD; an audio output device 404 such as a speaker; a biological information input device 405 such as a camera, a sight line input device, or a microphone; an input device 406 such as a keyboard, a mouse, or a touch panel; an output device 407 such as a display or a printer; a communication device 408 such as an NIC; and a bus connecting these components.

The memory 402 is, for example, a memory such as a RAM.

The external storage device 403 is a non-volatile storage device such as a so-called hard disk, an SSD, or a flash memory that can store digital information.

The communication device 408 is a wired communication device that performs a wired communication via a network cable, or a wireless communication device that performs a wireless communication via an antenna. The communication device 408 communicates with other devices connected to the network 50.

The learning content display unit 221, the region-of-attention identification unit 222, the utterance content identification unit 223, and the learner information reporting unit 224 described above are implemented by a program that causes the CPU 401 to perform processing. The program is stored in the memory 402 or the external storage device 403, loaded into the memory 402 upon execution, and executed by the CPU 401.

The input unit 230 is implemented by the input device 406, the output unit 240 is implemented by the output device 407, and the communication unit 250 communicably connected to a LAN or the like is implemented by the communication device 408.

The biological information input unit 260 is implemented by the biological information input device 405, and the audio input unit 270 and the audio output unit 280 are implemented by the biological information input device 405 and the audio output device 404, respectively.

The above is an example of the hardware configuration of the learning device 200 according to the present embodiment. However, the invention is not limited thereto, and other hardware may be used. For example, the information processing device may be any of various types of information processing devices such as a tablet device, a smartphone, and a television device.

Although not illustrated, the learning device 200 includes known elements such as an OS, middleware, and an application.

Figure 8:
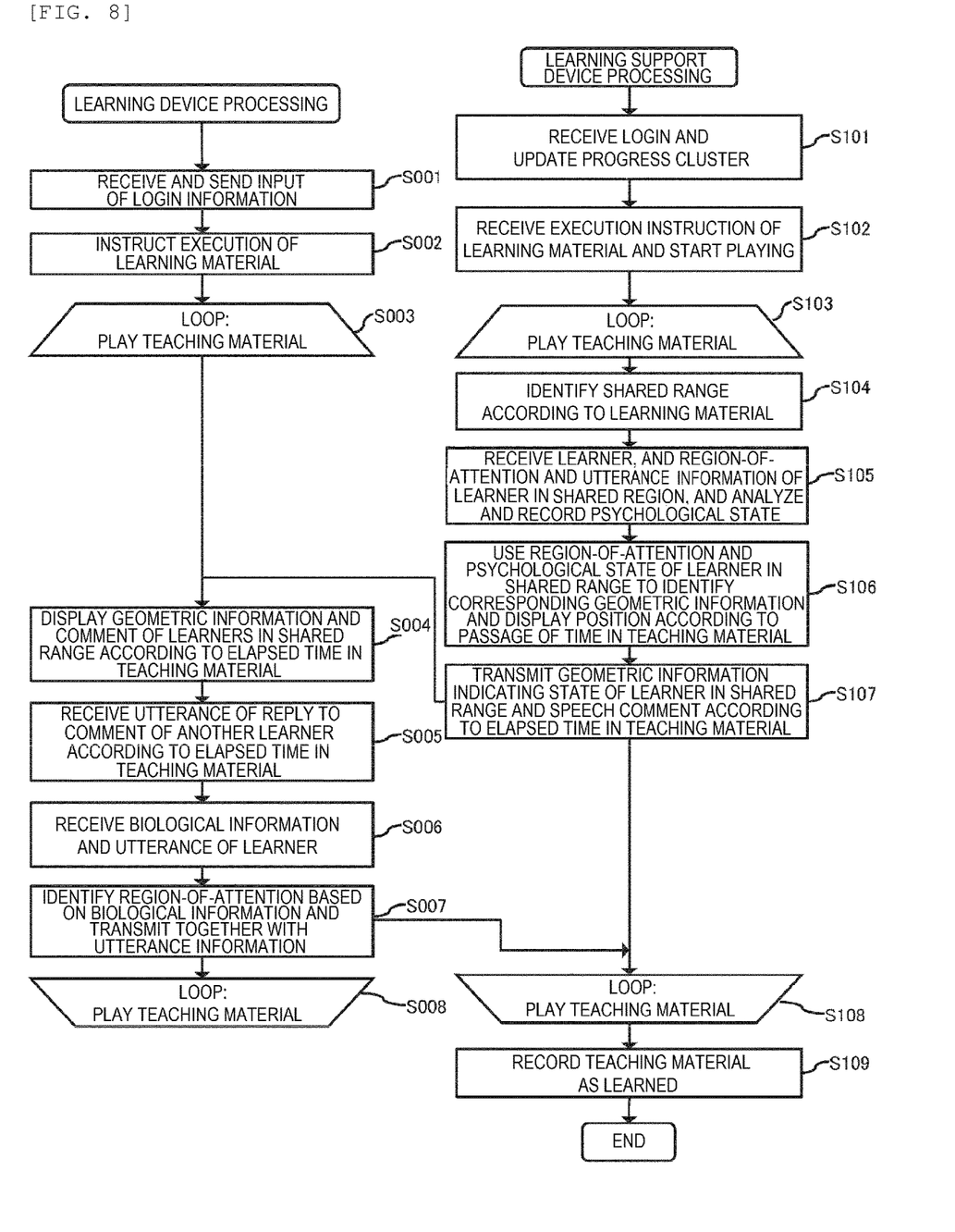
FIG. 8 is a flowchart showing an example of a learning processing performed by the learning device and the learning support device.

FIG. 8 is a flowchart showing an example of a learning processing performed by the learning device and the learning support device. The learning processing is started when the learner gives an instruction from the learning device 200.

First, in the learning device 200, the learning content display unit 221 displays a predetermined login screen, receives an input of login information (for example, a learner ID and a password) from a learner, and transmits the login information to the learning support device 100 (step S001).

Then, in the learning support device 100, the learning management unit 121 receives the login and updates the progress cluster (step S101). Specifically, the learning management unit 121 performs a predetermined authentication processing using the received login information. Then, the learning management unit 121 uses the information of the learned teaching material of the learner who has succeeded in login to compare with a distribution of progress of the other learners having learned similar learned teaching materials, thereby performing clustering processing, and specifies the progress cluster to which the logged-in learner belongs to update the learner information storage unit 112.

Then, the learning management unit 121 refers to the teaching material storage unit 111 and transmits the teaching material execution instruction screen to the learning device along a predetermined curriculum.

The learning content display unit 221 of the learning device 200 instructs execution of the learning material (step S002). Specifically, the learning content display unit 221 causes the output unit 240 of the learning device 200 to display the teaching material execution instruction screen transmitted in step S101, and receives a selection input of the teaching material. Then, the received teaching material execution instruction is transmitted to the learning support device 100.

The teaching material video display unit 122 of the learning support device 100 receives the execution instruction of the learning material and starts playing (step S102). Specifically, the teaching material video display unit 122 reads the video information of the teaching material data from the teaching material storage unit 111, creates a play screen, and transmits the play screen to the learning device 200. In addition, the teaching material video display unit 122 reads the shared cluster 111c from the teaching material storage unit 111, identifies one or both of the progress cluster and the attribute cluster as the shared range according to the teaching material, and specifically identifies the clusters corresponding to the learner who has logged in.

For example, when a shared cluster of a certain teaching material is an "attribute", an attribute cluster (for example, a belonging organization) of a learner is identified and set as a shared range. In addition, for example, when the shared cluster of a certain teaching material is "progress", the other learners belonging to the progress cluster of the learner (for example, progress 70%) are identified and set as the shared range.

Then, the teaching material video display unit 122 starts the play of the video of the teaching material. Specifically, screen information for streaming-outputting a screen for playing a video of a teaching material to be played is created and transmitted to the learning device 200.

In the learning support device 100, during the play of the teaching material, the following steps S104 to S107 are repeatedly performed (steps S103 and S108). In addition, the learning device 200 repeatedly performs the following steps S004 to S007 during the play of the teaching material (steps S003 and S008).

The shared range identification unit 127 identifies a shared range according to the learning material (step S104). Specifically, when the shared cluster of the teaching material is a progress cluster or the like in accordance with the learning material, the shared range identification unit 127 reconstructs a progress cluster constituted by the other learners having a similar region-of-attention and emotion with respect to the teaching material, and identifies the shared range.

That is, by dynamically changing the other learners having a similar understanding level for the teaching material at the time of playing the teaching material, it is possible to share the region-of-attention of the learners having a closer understanding level, and it is easy to share common feelings or question points to a comment or the like.

Then, the learner information reception unit 123 receives the learner and the region-of-attention and the speech of the learner in the shared range, and the learner information recording unit 124 stores the received information. Then, the psychological state analysis unit 128 analyzes and records the psychological state (step S105).

For example, when the region-of-attention of the learner is different from a description part of the teaching material, the psychological state analysis unit 128 determines that the interest of the learner is not consistent, and analyzes that the learner is in a negative psychological state. In addition, when the learner indicates a feeling of anger or is irritating, the psychological state analysis unit 128 analyzes that the learner is in a psychological state of being not satisfied with the description of the teaching material or being behind in the understanding level of learning. When the utterance of the learner is gentle and the region-of-attention of the learner and the description part of the teaching material are not different from each other, the psychological state analysis unit 128 analyzes that the learner understands sufficiently and performs learning positively.

Then, the learner information display creation unit 125 identifies the corresponding geometric information and display position using the region-of-attention and the psychological state of each learner in the shared range according to the passage of time in the teaching material (step S106). Specifically, the learner information display creation unit 125 statistically processes the region-of-attention of each learner in the shared range for each cluster to obtain a median value or an average value of coordinates, and assigns geometric information (polygonal diagram) for distinguishing the cluster to the position, thereby identifying the geometric information to be superimposed and the position for superimposing on the video information of the teaching material.

Then, the learner information transmission unit 126 transmits the geometric information and a speech comment of the learner in the shared range to the learning device 200 according to the elapsed time in the teaching material (step S107).

Then, when the transmitted geometric information and the speech comment of the learner in the shared range are received, the learning content display unit 221 of the learning device 200 displays the geometric information and the comment of the learner in the shared range according to the elapsed time in the teaching material (step S004). Specifically, the learning content display unit 221 identifies the display position of the geometric information, displays the information of the polygon as the predetermined geometric information for each cluster, colors the polygon with a predetermined color corresponding to a feeling such as blue when the feeling is positive and red when the feeling is negative, drops the polygon colored in the predetermined color corresponding to the emotion in a semi-transparent manner, and display the polygon in a superimposed manner on the teaching material.

The learning content display unit 221 may identify the size of the geometric information according to the length of staying time of the sight line. That is, it is possible to identify the region-of-attention at a glance by displaying the geometric information in a large size in a region-of-attention stared by the learner for a long time and displaying the geometric information in a small size in a region-of-attention stared by the learner for a short time.

Then, the utterance content identification unit 223 receives an uttered audio via the biological information input unit, identifies the utterance content, and receives the utterance as a reply to the comment of another learner according to the elapsed time in the teaching material (step S005). Specifically, when the region-of-attention at the time of utterance of the learner is a comment of another learner, the utterance content identification unit 223 recognizes the utterance content as a reply to the comment.

Then, the region-of-attention identification unit 222 and the utterance content identification unit 223 receive the biological information of the learner and the utterance (step S006). Specifically, the region-of-attention identification unit 222 identifies the position of the sight line of the learner received by the biological information input unit 260 and identifies the position as the region-of-attention, and the audio input unit 270 receives the utterance of the learner according to the region-of-attention.

When the region-of-attention at the time of utterance is the display region of the dialogue agent, the utterance content identification unit 223 recognizes that the conversation targets the agent. When the region-of-attention at the time of utterance is the display region of the teaching material, the utterance content identification unit 223 recognizes that the region-of-attention is an annotation such as a comment or a memo on the teaching material.

Then, the learner information reporting unit 224 transmits the biological information and utterance information to the learning support device 100 (step S007).

When the play of the teaching material is completed, the learning management unit 121 of the learning support device 100 records the teaching material used for learning as learned by the learner (step S109). Specifically, the learning management unit 121 adds the teaching material ID of the learned teaching material to the learned teaching material 112b of the learner information storage unit 112. Thereby, it is possible to appropriately update the progress cluster of the learner when starting learning of another teaching material.

The flow of the learning processing has been described above. By performing the learning processing, when the learner refers to the video of the teaching material, progress clusters having similar progress and attribute clusters having common affiliation are identified, and it is possible to refer to the estimated interest, concern, target, and reason of the other learners belonging to the cluster, which enables to obtain information close to a situation of the performed active learning.

Figure 9:
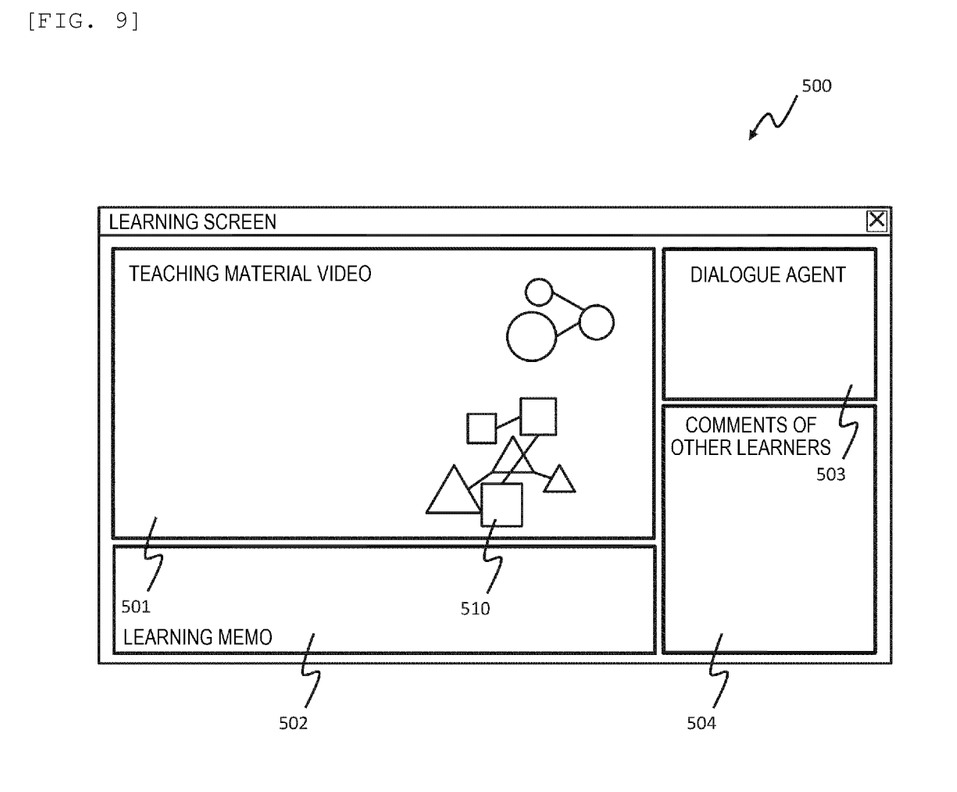
FIG. 9 is a diagram showing an example of a learning screen.

FIG. 9 is a diagram showing an example of a learning screen. The learning screen 500 includes a teaching material video display region 501, a learning memo display region 502, a dialogue agent display region 503, and comments of other learners 504. Over the entire learning screen 500, information indicating a time measurement change of the region-of-attention of the other learners or a statistical region-of-attention of the other learners belonging to the same cluster to which the learner belongs is superimposed and displayed as the geometric information 510.

The geometric information 510 may be information indicating a change in a region-of-attention of a specific anonymous learner. In addition, information indicating a change in a region-of-attention of a learner of another cluster to which the learner does not belong may be included. For example, by sharing a region-of-attention or a question point of another learner having a score higher than that of the learner, there is a possibility that the learner's motivation for learning is stimulated and the learning effect is improved.

As the geometric information, a larger polygonal figure (having a larger area) may be used as the gaze time of the region-of-attention is longer, a smaller polygonal figure (having a smaller area) may be used as the gaze time of the region-of-attention is shorter, and when there is an instantaneous movement, a locus thereof may be displayed. This enables to obtain a large amount of learning information more intuitively.

The above is the learning support system according to the first embodiment. According to the learning support system, a learning effect can be enhanced by sharing a matter of interest among learners viewing a learning content.

It should be noted that the invention is not limited to the embodiment described above and includes various modifications. For example, a personal learning environment can be implemented by recording the transition of the region-of-attention for each learner ID and making it possible to refer to the transition from the educator 30 or another learner to obtain feedback. The embodiment mentioned above has been described in detail for clearly explaining the invention, but are not necessarily to be considered limited to the inclusion of all of the configurations described.

A part of a configuration of an embodiment may be replaced with a configuration of another embodiment, or the configuration of another embodiment may be added to the configuration of the embodiment.

In addition, a part of a configuration of each embodiment can be added, deleted, or replaced with another configuration.

In addition, a part or all of the above configurations, functions, processing units, processing methods and the like may be implemented by hardware such as through design using an integrated circuit. Each of the configurations, the functions, or the like described above may be implemented by software by interpreting and executing a program for implementing respective functions by the processor. Information such as a program, a table, a file, and the like for implementing the respective functions can be stored in a recording device such as a memory, a hard disk, or an SSD, or in a recording media such as an IC card, an SD card, or a DVD.

Further, control lines or information lines indicate what is considered necessary for description, and the control lines or information lines are not all necessarily shown in a product. It may be considered that almost all the configurations are actually connected to each other.

The invention is not limited to the learning support system, and can be provided in various forms such as a learning support device, a computer-readable program, and a learning support method.

REFERENCE SIGN LIST 10 learning support system
20 learner group
30 educator 50 network
100 learning support device
110 storage unit
111 teaching material storage unit
112 learner information storage unit
113 region-of-attention storage unit
120 processing unit
121 learning management unit
122 teaching material video display unit
123 learner information reception unit
124 learner information recording unit
125 learner information display creation unit
126 learner information transmission unit
127 shared range identification unit
128 psychological state analysis unit
150 communication unit
200 learning device
220 processing unit
221 learning content display unit
222 region-of-attention identification unit
223 utterance content identification unit
224 learner information reporting unit
230 input unit
240 output unit
250 communication unit
260 biological information input unit
270 audio input unit
280 audio output unit

The invention claimed is:

1. A learning support system, comprising:
a learning content display unit configured to play and display a teaching material video;
a learner information reporting unit configured to acquire biological information of a learner during play of the teaching material video and report the biological information as learner information;
a region-of-attention identification unit configured to identify a region-of-attention of the learner based on the biological information;
a learner information display creation unit configured to generate a screen in which the region-of-attention is superimposed on the teaching material video of another learner belonging to the same cluster as the learner; and
a learner information transmission unit configured to transmit the screen to the another learner.

2. The learning support system according to the claim 1, wherein
the learner information display creation unit is configured to integrate information indicating a time-series change of the region-of-attention when the region-of-attention is superimposed.

3. The learning support system according to the claim 1, wherein
the biological information is an image including a facial expression of the learner,
the learning support system further comprises a psychological state analysis unit configured to obtain information indicating a psychological state of the learner by analyzing the biological information, and
the learner information display creation unit is configured to superimpose the information indicating the psychological state together with the region-of-attention by predetermined geometric information.

4. The learning support system according to the claim 1, wherein the learner information reporting unit is configured to acquire language output information of the learner together with the biological information of the learner during the play of the teaching material video, and integrate the language output information of the learner in the learner information, and
the learner information display creating unit is configured to generate a comment sentence by extracting the comment sentence from the language output information, and superimpose the comment sentence together with the region-of-attention.

5. The learning support system according to the claim 1, further comprising:
a psychological state analysis unit configured to obtain information indicating a psychological state of the learner by analyzing the biological information, wherein
the learner information reporting unit is configured to acquire language output information of the learner together with the biological information of the learner during the play of the teaching material video, and integrate the language output information of the learner in the learner information, and
the learner information display creating unit is configured to superimpose the information indicating the psychological state together with the region-of-attention by predetermined geometric information, generate a comment sentence by extracting the comment sentence from the language output information, and superimpose the comment sentence together with the region-of-attention.

6. The learning support system according to the claim 1, wherein
the learner information display creation unit is configured to generate the screen in which the region-of-attention is superimposed by a predetermined polygon.

7. The learning support system according to the claim 3, wherein
the learner information display creation unit is configured to superimpose geometric information using a predetermined color according to the information indicating the psychological state together with the region-of-attention.

8. The learning support system according to the claim 5, wherein
the geometric information corresponding to the information indicating the psychological state and the comment sentence are output via a predetermined dialogue agent.

9. The learning support system according to the claim 1, wherein
the another learner is another learner having a learning progress similar to that of the learner.

10. The learning support system according to the claim 1, wherein
the another learner is another learner whose learned teaching material is similar to that of the learner.

11. The learning support system according to the claim 1, wherein
the learner information display creation unit is configured to generate the screen in which the region-of-attention is superimposed while targeting the region-of-attention for which an instruction is received from the learner.

* * * * *